US008925015B2

(12) United States Patent
Van Vleck et al.

(10) Patent No.: US 8,925,015 B2
(45) Date of Patent: Dec. 30, 2014

(54) SYSTEM AND METHOD OF DETERMINING VIEWERSHIP INFORMATION

(75) Inventors: Paul Van Vleck, Austin, TX (US); Michael Devlin, Leander, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1600 days.

(21) Appl. No.: 11/880,445

(22) Filed: Jul. 20, 2007

(65) Prior Publication Data
US 2009/0025025 A1    Jan. 22, 2009

(51) Int. Cl.
G06F 3/00 (2006.01)
G06F 13/00 (2006.01)
H04N 5/445 (2011.01)
H04L 12/66 (2006.01)

(52) U.S. Cl.
CPC .................................... *H04L 12/66* (2013.01)
USPC .................. 725/50; 725/14; 725/27; 725/28; 725/34; 725/35; 725/36; 725/40; 725/46; 709/217; 709/218; 709/219; 709/224; 370/352; 370/395.31

(58) Field of Classification Search
USPC ........... 725/14, 16, 25, 27–28, 32, 34–36, 40, 725/44, 46, 50; 709/217–219, 224; 370/352, 395.31
See application file for complete search history.

(56) References Cited

U.S. PATENT DOCUMENTS

| 6,968,364 | B1 * | 11/2005 | Wong et al. .................... 709/217 |
| 7,007,100 | B1 | 2/2006 | Doong |
| 2002/0035730 | A1 * | 3/2002 | Ollikainen et al. .............. 725/93 |
| 2002/0112239 | A1 * | 8/2002 | Goldman ......................... 725/46 |
| 2003/0066074 | A1 * | 4/2003 | Zimmerman et al. ........... 725/14 |
| 2003/0066078 | A1 * | 4/2003 | Bjorgan et al. .................. 725/34 |
| 2003/0106065 | A1 * | 6/2003 | Sakai et al. ..................... 725/91 |
| 2004/0158872 | A1 * | 8/2004 | Kobayashi ..................... 725/120 |
| 2006/0080718 | A1 * | 4/2006 | Gray et al. ..................... 725/100 |
| 2006/0137002 | A1 * | 6/2006 | Forrester ......................... 726/11 |
| 2006/0294555 | A1 * | 12/2006 | Xie ................................. 725/88 |
| 2007/0130585 | A1 * | 6/2007 | Perret et al. ..................... 725/46 |
| 2007/0136753 | A1 * | 6/2007 | Bovenschulte et al. ......... 725/46 |
| 2007/0266401 | A1 * | 11/2007 | Hallberg ......................... 725/46 |
| 2008/0147497 | A1 * | 6/2008 | Tischer ........................... 705/14 |

OTHER PUBLICATIONS www.cisco.com; Internet Protocol (IP) Multicast; Oct. 12, 2006; Cisco Systems.
www.juniper.net; Routing and Forwarding Tables; 1998-2006; Juniper Networks, Inc.
www..juniper.net; Multicast Packet Forwarding; 1998-2005; Juniper Networks, Inc.

* cited by examiner

*Primary Examiner* — Jason Salce
(74) *Attorney, Agent, or Firm* — Toler Law Group, PC

(57) ABSTRACT

Systems and methods of determining viewership information are provided. A method of determining viewership information includes determining viewership information from multicast routing table data associated with one or more edge routers of a media content delivery service. Each edge router of the one or more edge routers is adapted to transmit media content streams to multiple devices via a first network. The method also includes sending data related to the viewership information to a requesting device via a second network.

26 Claims, 11 Drawing Sheets

SYSTEM AND METHOD OF DETERMINING VIEWERSHIP INFORMATION

FIELD OF THE DISCLOSURE

The present disclosure is generally related to a system and method of determining viewership information.

BACKGROUND

Providers of television services are interested in viewership information about what programs and channels are being watched by television viewers. The providers of television services may want to monitor viewing habits to gather information for use in making decisions about programming. Additionally, viewers may want to know what is popular with other viewers. Such services require that the viewership information is updated quickly. However, conventional data collection systems for determining viewership can be slow to update, processor intensive, bandwidth intensive (adversely impacting performance), or any combination thereof. Additionally, such data collections systems may not be scalable as the number of viewers increases. Hence, there is a need for an improved system and method of determining viewership information.

DETAILED DESCRIPTION OF THE DRAWINGS

In a particular illustrative embodiment, a method of determining viewership information is disclosed that includes determining viewership information from multicast routing table data associated with one or more edge routers of a media content delivery service. Each edge router of the one or more edge routers is adapted to transmit media content streams to multiple devices via a first network. The method also includes sending data related to the viewership information to a requesting device via a second network.

In another particular illustrative embodiment, a system is disclosed that includes an interface to communicate with one or more edge routers via a private network. The one or more edge routers are adapted to communicate media content to customer premises equipment (CPE) devices. Each edge router includes a multicast routing table including data relating multicast media content to particular CPE devices. The system also includes a data analyzer that is coupled to the interface and adapted to retrieve multicast routing table data from the one or more edge routers via the interface. The data analyzer is to process the multicast routing table data to determine viewership information and to generate a graphical user interface including data related to the viewership information.

In still another particular illustrative embodiment, a system is disclosed that includes processing logic and memory accessible to the processing logic. The memory includes instructions that are executable by the processing logic to determine viewership information from multicast routing table data associated with one or more edge routers of a media content delivery service and send data related to viewership information to a requesting device via a second network. Each edge router of the one or more edge routers is adapted to transmit media content streams to multiple devices via a network. The data can indicate viewership of media content streams.

In yet another particular illustrative embodiment, a method of determining viewership information is disclosed that includes receiving multicast routing table data from one or more edge routers associated with a content delivery service. The one or more edge routers are to route media content streams from the content delivery service to customer premises equipment devices. The method further includes analyzing the multicast routing table data to determine viewership information associated with each media content stream and sending data related to the viewership information to a requesting device.

Figure 1:
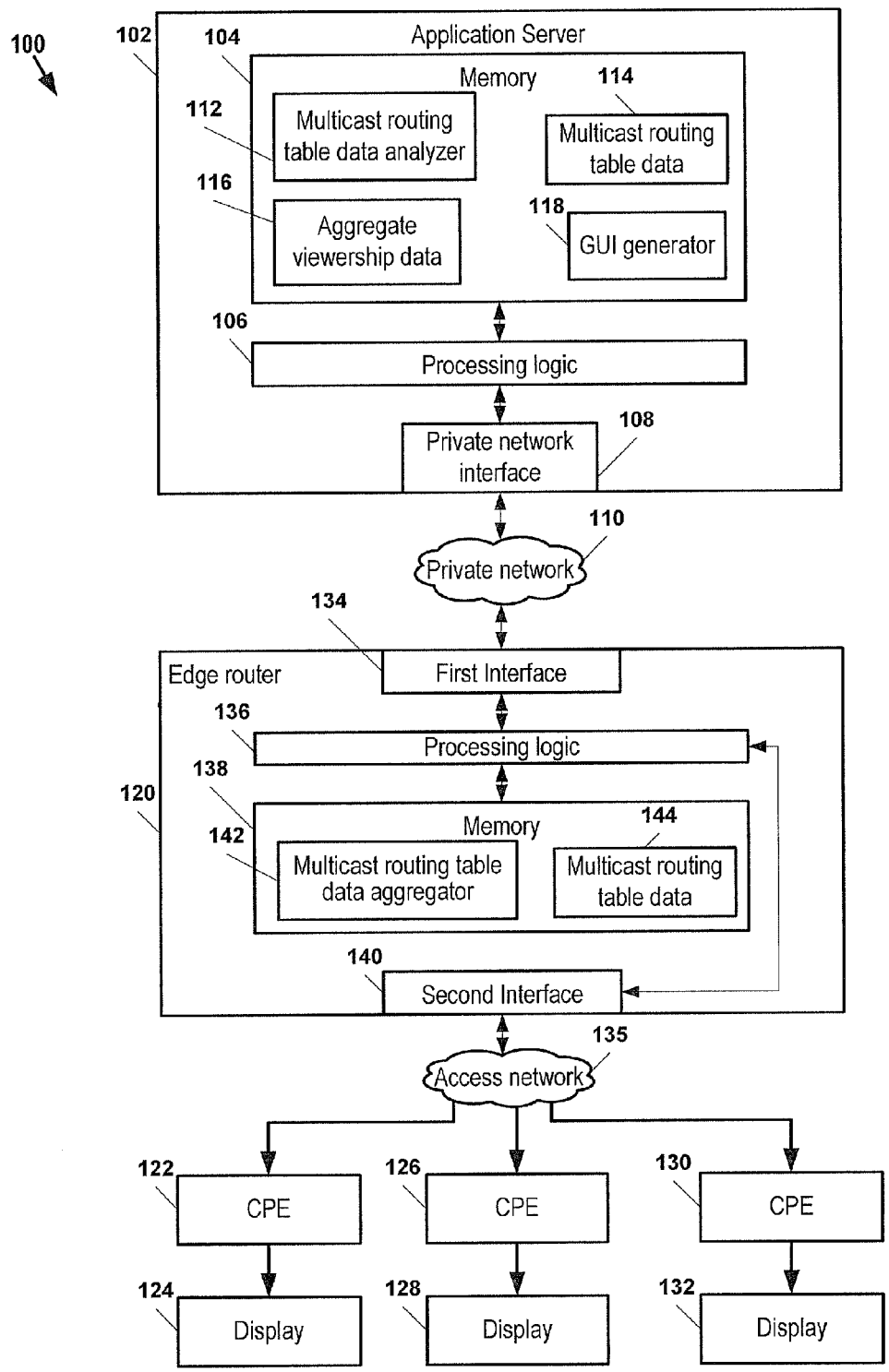
FIG. 1 is a block diagram of a particular embodiment of a system to determine viewership information.

FIG. 1 is a block diagram of a particular embodiment of a system 100 to determine viewership information. The system 100 includes an application server 102 that can communicate with one or more edge routers, such as the edge router 120, via a private network 110. Each of the one or more edge routers, such as the edge router 120, can communicate with one or more customer premises equipment (CPE) devices, such as the CPE devices 122, 126, and 130, via an access network 134. The CPE devices 122, 126, and 130 can communicate video and audio information to respective display devices, such as the displays 124, 128, and 132. In a particular illustrative embodiment, the access network 134 may be an Internet Protocol Television (IPTV) network for delivering media content.

The application server 102 includes a memory 104, processing logic 106 having access to the memory 104, and a private network interface 108 that is responsive to the private network 110. The memory 104 includes a multicast routing table data analyzer 112 that is executable by the processing logic 106 to receive multicast routing table data 114 and to generate viewership information or data 116 from the multicast routing table data 114. The multicast routing table data 114 may be received from one or more edge routers, such as the edge router 120, which maintains multicast routing table data related to delivery of media content data streams to the one or more CPE devices 122, 126, and 130. The viewership data 116 may include aggregated viewership information. In general, the multicast routing table data analyzer 112 may receive multicast routing table data from multiple edge routers, such as the edge router 120, of the system 100. The multicast routing table analyzer 112 can merge, add, accumulate, or otherwise combine the received data to produce the aggregated viewership data. Additionally, such aggregated viewership data may include historical data that can be retrieved from a data storage. In a particular illustrative embodiment, the application server 102 also includes a graphical user interface (GUI) generator 118 to generate a graphical user interface (GUI) that includes data related to the viewership data 116.

The edge router 120 includes a first interface 134 responsive to the private network 110, a second interface 140 responsive to an access network 135, processing logic 136 coupled to the first interface 134 and to the second interface 140, and a memory 138 accessible to the processing logic 136. The edge router 120 can provide media content data streams, such as broadcast television data streams, from a content provider (or from the application server 102) to the one or more CPE devices 126, 128, and 130 via the access network 135. The memory 138 may include a multicast routing table data aggregator 142 that is executable by the processing logic 136 to aggregate routing information related to the routing of media content to the one or more CPE devices 122, 126 and 130. The processing logic 136 may store such multicast routing table data 144 in the memory. Each media content data stream can be understood to represent a channel, such as a television channel. In general, the edge router 120 can be a routing device that is part of a service provider network, such as an Internet Protocol Television (IPTV) network. The edge router 120 is operable to route packets between a content provider, such as the application server 102, and the CPE devices 122, 126 and 130. The edge router 120 stores information related to the routing of packets to the CPE devices 122, 126, and 130 in a memory 138 that includes multicast routing table data 144. The multicast routing table data 144 may also include forwarding descriptions for routing data to another edge router.

The multicast routing table data 114 can include information related to the routing of the media content data streams that are distributed by the edge router 120 to the CPE devices 122, 126 and 130. In a particular illustrative embodiment, the multicast routing table data 114 can include multicast routing information from the edge router 120 and from other edge routers (not shown) that are associated with the system 100. The multicast routing table data 144 and the multicast routing table data 114 can include network address information, CPE device information, routing information, and information about the media content data stream, including channel information, the date and time information, other information, or any combination thereof. The multicast routing table data 144 may include routing information that is associated with the routing performed by the edge router 120, while the multicast routing table data 114 may include such routing information associated with the edge router 120 and with other edge routers (not shown) of the system. It should be understood that, at any particular moment, the information included in the multicast routing table data 114 may vary from the information in the multicast routing table data 144 of the edge router 120. In a particular illustrative embodiment, the multicast routing table data 114 may be updated with data related to the multicast routing table data 144 periodically, based on a triggering event (such as a request), or any combination thereof.

In a particular illustrative, the edge router 120 routes media content data streams to the one or more CPE devices 122, 126, and 130. The processing logic 136 can execute the multicast routing table data aggregator 142 to store routing information related to each CPE device 122, 126 and 130 in the memory 138 in the multicast routing table data 144 based on the routing of the media content data streams. The edge router 120 may receive a request for the multicast routing table data 144 from another device, such as the application server 102. The edge router 120 can send data related to the multicast routing table data 144 to the application server 102 in response to receiving the request.

In a particular illustrative embodiment, the processing logic 106 of the application server 102 can execute the graphical user interface (GUI) generator 118 to generate a graphical user interface that includes selectable elements to allow a user to interact with the system 100 to request viewership information. In another particular illustrative embodiment, the retrieval of the viewership information may be triggered by an access to a particular Internet address or web page, for example. In response to receiving a request for viewership information, the processing logic 106 can execute the multicast routing table data analyzer 112 to request routing data from one or more edge routers, such as the edge router 120. The multicast routing table data analyzer 112 can receive data related to the multicast routing table data 144 from the edge router 120 and can store the data in the multicast routing table data 114. The multicast routing table data analyzer 112 can process the stored data from the multicast routing table data 114 to determine viewership information, such as aggregate viewership data 116. In a particular illustrative embodiment, the multicast routing table data analyzer 112 can be used to collect or retrieve viewership data from multiple edge routers and to aggregate the viewership data to produce the viewership data 116. The aggregate viewership data 116 can indicate viewership at a particular time or over a particular time period. Additionally, the viewership data 116 can indicate viewership of particular channels at particular times and dates based on the routing of the multicast media content data streams by the edge router 120 via the access network 134 to set-top box devices, such as the CPE devices 122, 126 and 130.

In a particular illustrative embodiment, the processing logic 106 can execute the graphical user interface (GUI) generator 118 to produce a graphical user interface that includes data related to the viewership data 116. The processing logic 106 can provide the graphical user interface to a device, such as a CPE device 122, 126, and 130, an administrative system, a computer via a public network (such as the requesting device 210 in FIG. 2), another device, or any combination thereof.

In a particular illustrative embodiment, media content data streams may be routed to the CPE devices 122, 126 and 130 via a hierarchy of routers and edge routers. The edge routers may propagate the multicast routing data through the hierarchy of edge routers to aggregate the multicast routing data at a particular level of the edge routers within the hierarchy. In a particular illustrative embodiment, the multicast routing table data analyzer 112 may be adapted to calculate viewership statistics, such as a percentage of viewers that are viewing a particular channel or media content data stream at a particular time. The GUI generator 118 can generate a presentation that includes such statistical information, which may be provided to the CPE devices 122, 126 and 130 as a window of an electronic program guide.

Figure 2:
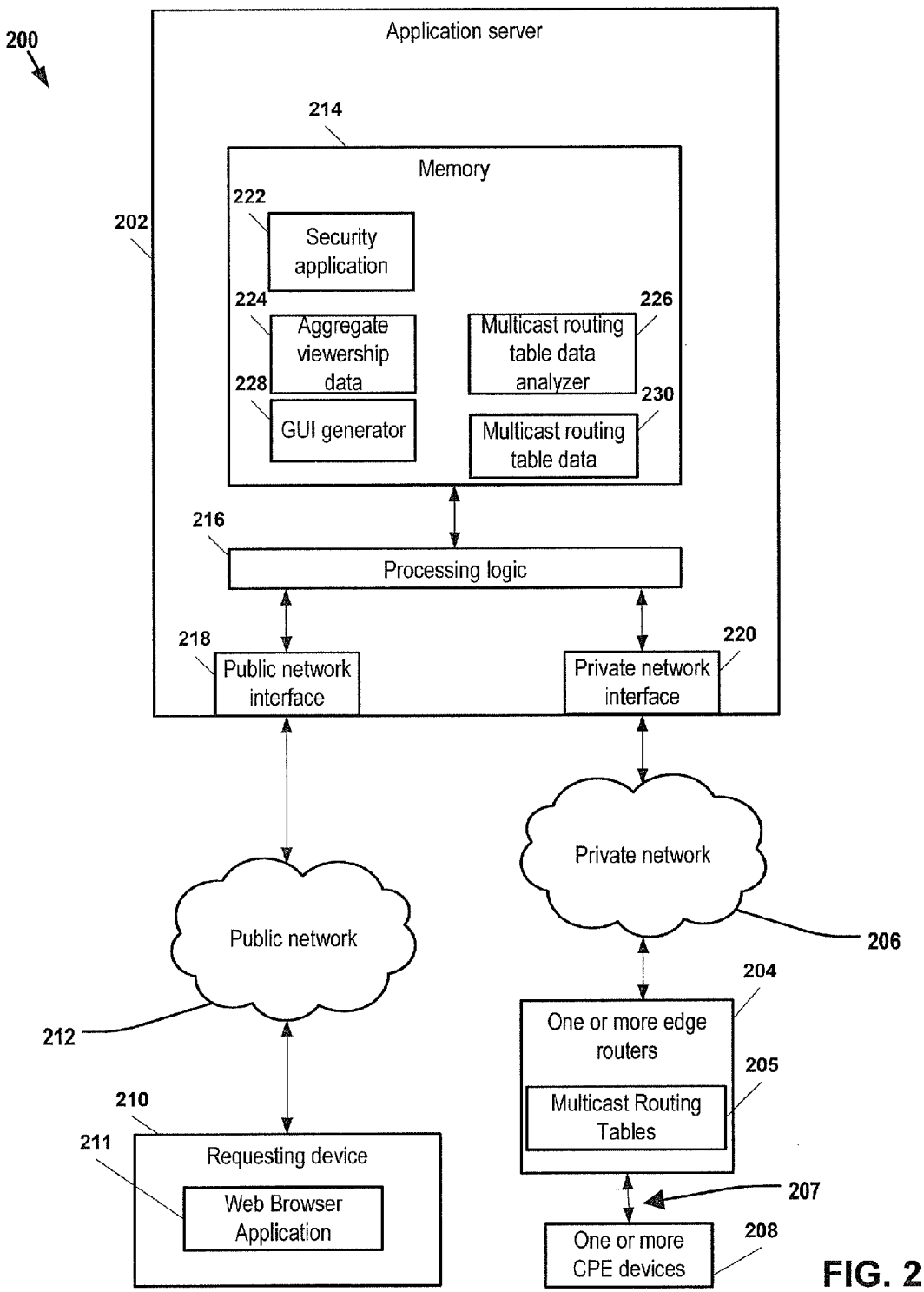
FIG. 2 is a block diagram of a second particular embodiment of a system to determine viewership information.

FIG. 2 is a block diagram of a second particular embodiment of a system 200 to determine viewership information. The system 200 includes an application server 202 that can communicate with one or more edge routers 204 including multicast routing tables 205 via a private network 206. The application server 202 can also communicate with a requesting device 210 including a web browser application 211 via a public network 212. In a particular illustrative embodiment, the public network 212 may be a wide area network accessible by a plurality of users, such as the Internet. Each of the one or more edge routers 204 can communicate with one or more customer premises equipment (CPE) devices 208 via an access network 207. In a particular illustrative embodiment, the private network 206, the one or more edge routers 204, the access network 207, other devices, or any combination thereof may be components of an Internet Protocol Television (IPTV) network for delivering media content. In a particular illustrative embodiment, media content data streams may be routed to the CPE devices 208 via a hierarchy of routers and edge routers. The edge routers may propagate the multicast routing data through the hierarchy of edge routers to aggregate the multicast routing data at a particular tier of the edge routers within the hierarchy.

The application server 202 includes a memory 214, processing logic 216 having access to the memory 214, and a private network interface 220 that is responsive to the private network 206. The memory 214 includes a multicast routing table data analyzer 226 that is executable by the processing logic 216 to receive multicast routing table data 230 and to generate information or viewership data 224 from the multicast routing table data 230. The multicast routing table data 230 may be aggregated from the multicast routing tables 205 of the one or more edge routers 204, which maintain multicast routing table data related to the routing of media content data streams to the one or more CPE devices 208. In a particular illustrative embodiment, the application server 202 also includes a graphical user interface (GUI) generator 228 to generate a graphical user interface that includes data related to the viewership data 224.

In a particular illustrative embodiment, media content data streams transmitted to the one or more CPE devices 208 via the one or more edge routers 204 can be understood to represent channels, such as television channels. The one or more edge routers 204 can route packets between a content provider, such as the application server 202, and the CPE device 208. The one or more edge routers 204 may store information related to the media content streams that are forwarded to the one or more CPE devices 208. In a particular illustrative embodiment, the one or more edge routers 204 can also store forwarding descriptions for routing data to another edge router of the content delivery network within the multicast routing tables 205.

The multicast routing table data 230 can include information related to the routing of the media content data streams to the CPE device 208 by the one or more edge routers 204 based on the multicast routing tables 205. In a particular illustrative embodiment, the multicast routing table data 230 can include multicast routing information from the multicast routing tables 205 of the one or more edge routers 204 and from other edge routers (not shown) associated with the system 200. The multicast routing table data 230 can include network address information, CPE device information, routing information, and information about the media content data stream, including channel information, date and time information, other information, or any combination thereof.

In a particular illustrative, the requesting device 210 may access the public network 212 via a web browser application 211. The requesting device 210 may transmit a request for viewership information to the application server 202 via the public network 212. The requesting device 210 can be a computer, a web-enabled mobile communications device, a personal digital assistant, another electronic device having web browsing functionality, or any combination thereof.

The application server 202 may receive a request for viewership information from the requesting device 210 via a public network interface 218. The application server 202 may utilize a security application 222 to authenticate the requesting device 210. If the requesting device 210 is authenticated and authorized to access the viewership information, the processing logic 216 of the application server 202 can execute the multicast routing table data analyzer 226 to request routing data from the one or more edge routers 204.

In a particular illustrative embodiment, the one or more edge routers 204 may receive a request for multicast routing table data from the application server 202. The one or more edge routers 204 can access the multicast routing tables 205 to retrieve multicast routing table data and send data related to the multicast routing tables 205 to the application server 202 in response to receiving the request. The multicast routing table data analyzer 226 can receive data related to the multicast routing tables 205 from the one or more edge routers 204 and store the data in the multicast routing table data 230. The multicast routing table data analyzer 226 can process the multicast routing table data 230 to determine viewership information, such as the viewership data 224. In a particular illustrative example, the multicast routing data analyzer 226 may be adapted to calculate viewership statistics, such as a percentage of viewers that are viewing a particular channel or media content data stream at a particular time. The viewership data 224 can indicate viewership information related to the routing of media content data streams to the one or more CPE devices 208 at a particular time or over a particular time period. Such viewership data 224 can include statistics related to the routing of media content data streams. The application server 202 may utilize the GUI generator 228 to generate a GUI that includes data related to the viewership data. The GUI generator 228 can generate a presentation that includes such statistical information, which may be provided to the CPE device 208 as a window of an electronic program guide. The application server 204 may send the generated GUI including the data related to the viewership data 224 to the requesting device 210 via the public network 212. In particular embodiments, the processing logic 216 may provide the GUI to a device, such as the one or more CPE devices 208, an administrative system, the requesting device 210 via the public network 212, another device, or any combination thereof.

Figure 3:
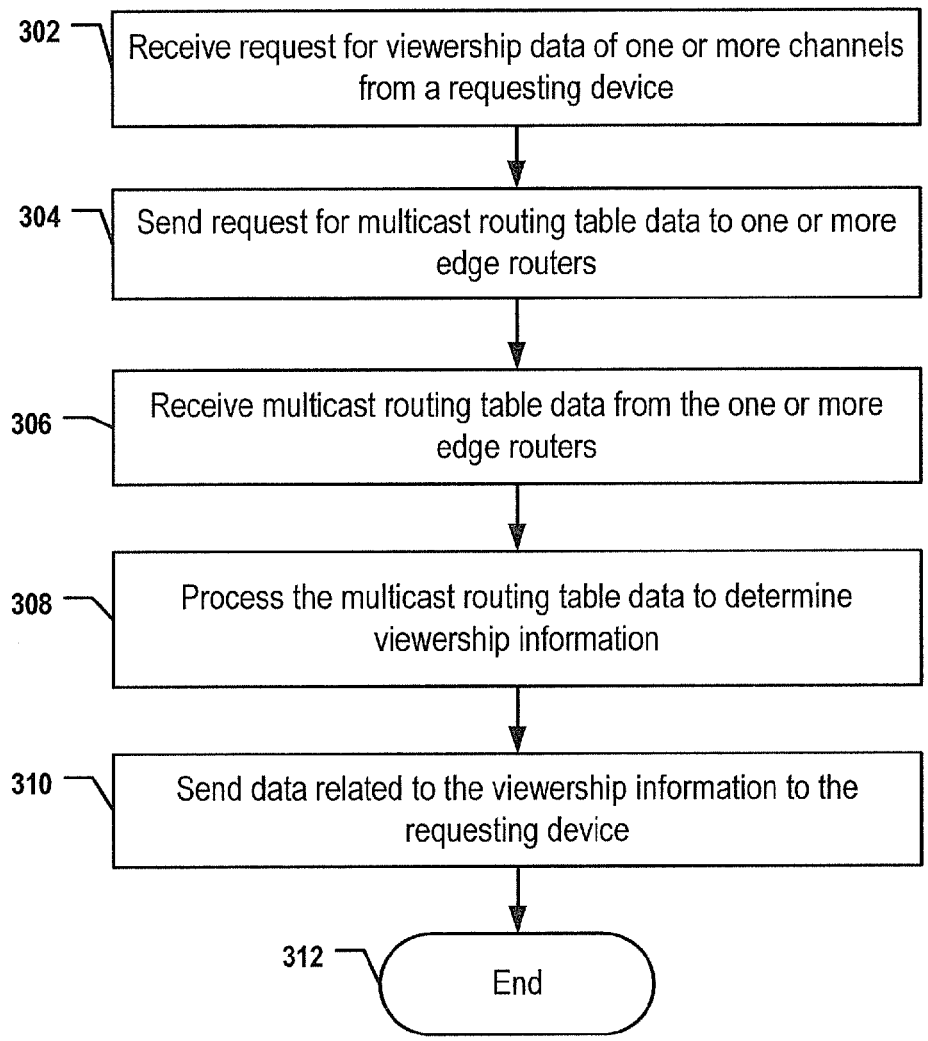
FIG. 3 is a flow diagram of a particular embodiment of a method of determining viewership information.

FIG. 3 is a flow diagram of a particular embodiment of a method 300 of determining viewership information. At 302, an application server receives a request for aggregate viewership data from a requesting device. In particular illustrative embodiments, the requesting device may be a personal computer, a set top box, another device, or any combination thereof. In another embodiment, the requesting device may be a component of an administrative system, such as a viewership analyzer 1084 illustrated as a part of an operations and management tier 1008 in FIG. 10.

Moving to 304, the application server sends a request for multicast routing table data to one or more edge routers. The request may be sent via a private access network. Advancing to 306, the application server can receive multicast routing table data from the one or more edge routers. The multicast routing table data can include routing information, CPE device information, network address information, channel information indicating the time and date information, channel information, other information, or any combination thereof.

Continuing to 308, the application server can process the received multicast routing table data to determine viewership information based on the multicast routing table data. In a particular illustrated embodiment the application server can determine viewership information related to one or more channels. Advancing to 310, the application server can send data related to the viewership information to the requesting device. The method terminates at 312.

In a particular illustrative embodiment, the application server can generate a graphical user interface (GUI) that includes data related to the viewership information and can send the GUI to another device via a public or private network. The data related to the viewership information can include raw data, statistical information derived from the multicast routing table data, other information, or any combination thereof. In a particular illustrative embodiment, the GUI may be generated as part of an electronic program guide accessible by a CPE device. In another particular embodiment, the GUI may be generated as a web page that is accessible using a web browser application. In a particular illustrative, non-limiting embodiment, the GUI may include a list of a top five, top ten, or other number of currently viewed programs or media content streams based on the data related to the viewership information. For example, the data related to the viewership information may indicate a ranking of available media content data streams based on the number of viewers currently tuned to those media content data streams.

Figure 4:
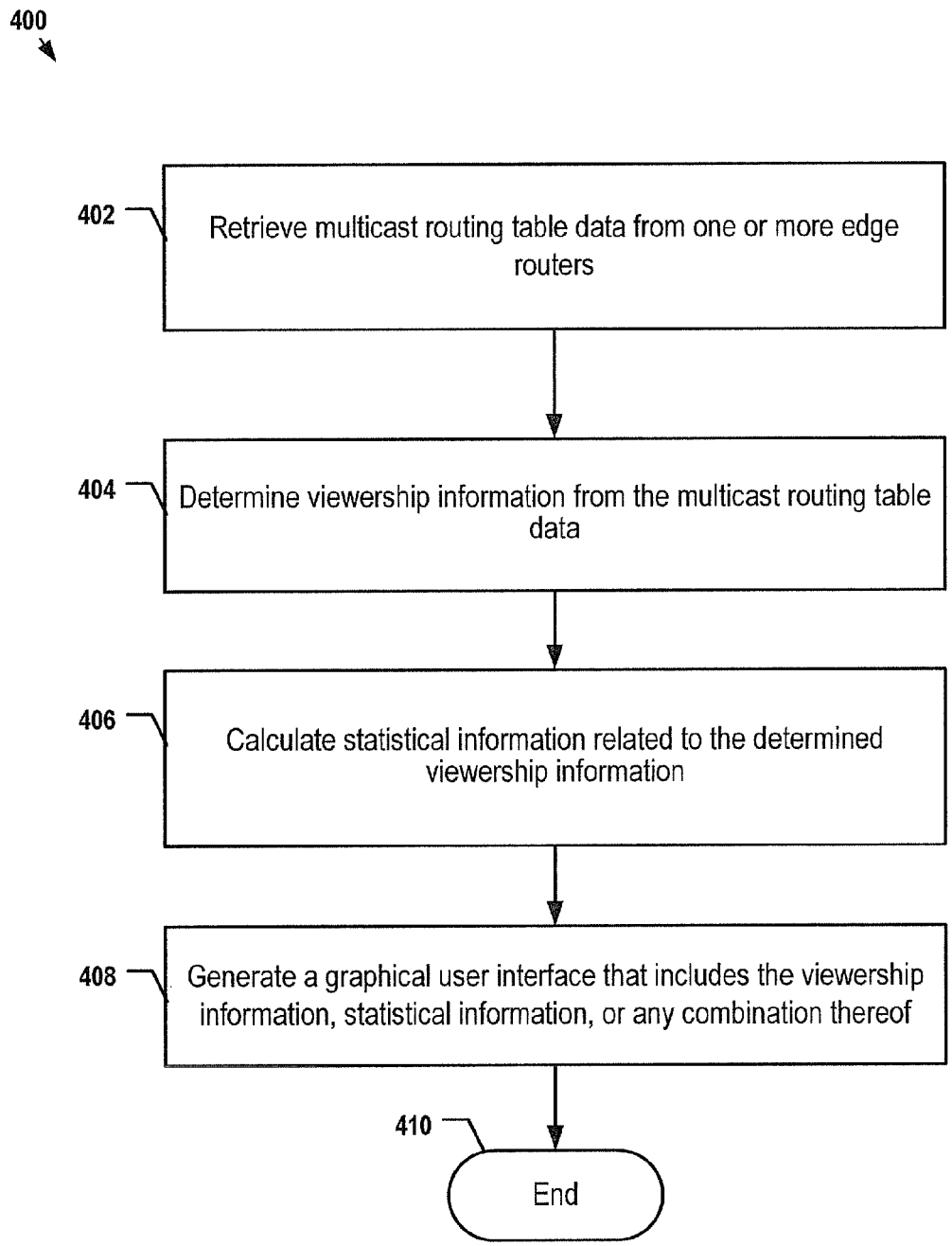
FIG. 4 is a flow diagram of a second particular embodiment of a method of determining viewership information.

FIG. 4 is a flow diagram of a second particular illustrative embodiment of a method 400 of determining viewership information. At 402, an application server retrieves multicast routing data from one or more edge routers. In a particular illustrative embodiment, the application server can poll the one or more edge routers, send a request for multicast routing table data to the one or more edge routers, or any combination thereof. In another particular illustrative embodiment, the one or more edge routers may be configured to periodically transmit the multicast routing table data to the application server, and the application server may wait for and receive the multicast routing table data.

Advancing to 404, the application server determines viewership information from the retrieved multicast routing table data. The application server may process the multicast routing table data to identify network address information, media content data stream packet information, customer premises equipment (CPE) device information, or any combination thereof.

Proceeding to 406, the application server calculates statistical information related to the determined viewership information. In a particular illustrative, non-limiting example, the statistical information can include a percentage of viewers that are watching a particular program in real time or near real time. In another particular embodiment, the statistical information can include aggregate viewership information related to multiple channels.

Continuing to 408, the application server generates a graphical user interface (GUI) that includes data related to the viewership information, the statistical information, or any combination thereof. In a particular illustrative embodiment, the GUI may be a web browser interface (e.g., a web page), an electronic program guide menu interface, another interface, or any combination thereof. The method terminates at 410.

Figure 5:
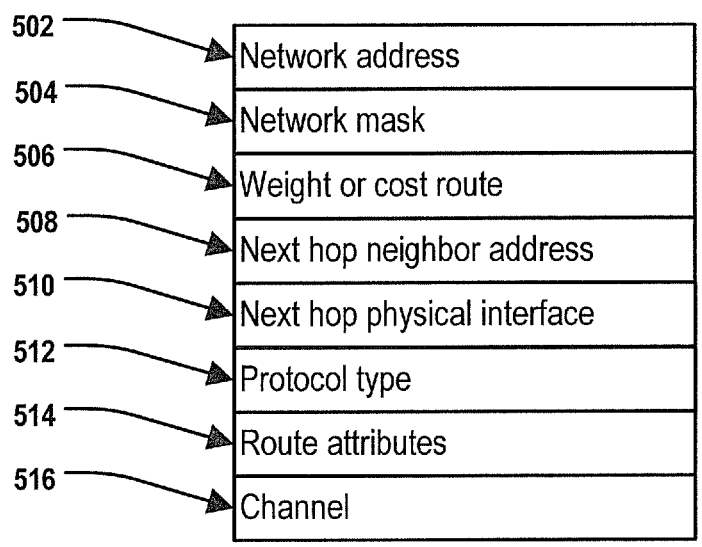
FIG. 5 is a diagram of a particular embodiment of a multicast routing data table from which viewership information can be determined.

FIG. 5 is a block diagram of a particular embodiment of a record 500 from a multicast routing table that can be used to determine viewership information. In general, the multicast routing table can include multiple records, such as the record 500. The record 500 can store information related to a route or network path, including a network address 502 such as an Internet Protocol (IP) address. The record 500 may also include a network mask 504, which may be 32-bit number indicating a range of IP addresses residing on a single IP network or subnet. The record 500 may also include a weight or cost of a route (or network path) 506, which may include information related to a bandwidth usage, quality of service requirements, other information, or any combination thereof. The record 500 may also include a next hop neighbor address 508, such as an IP address associated with other CPE devices or other set-top box devices that receive media content from a common edge router. The record 500 can also include a protocol type 512, such as a routing protocol, which may include protocol types such as a Distance Vector Multicast Routing Protocol, a Dense-mode Protocol Independent Multicast, a Border Gateway Multicast Protocol, or other protocols. Additionally, the record 500 can include one or more route attributes 514, such as transmission quality information. The record 500 may also include channel information 516, such as media content information, channel data, date and time information, other information, or any combination thereof.

In general, an analyzer at an application server, for example, can parse information retrieved from one or more records of a multicast routing table to extract data that can be used to determine viewership information. The multicast routing table can be used to map the multicast routing information to specific channels (i.e., to particular media content data streams). The channel information 516 can include data that relates the media content data stream to a selected channel of the content delivery network or Internet Protocol Television (IPTV) system, such as a broadcast television channel.

Figure 6:
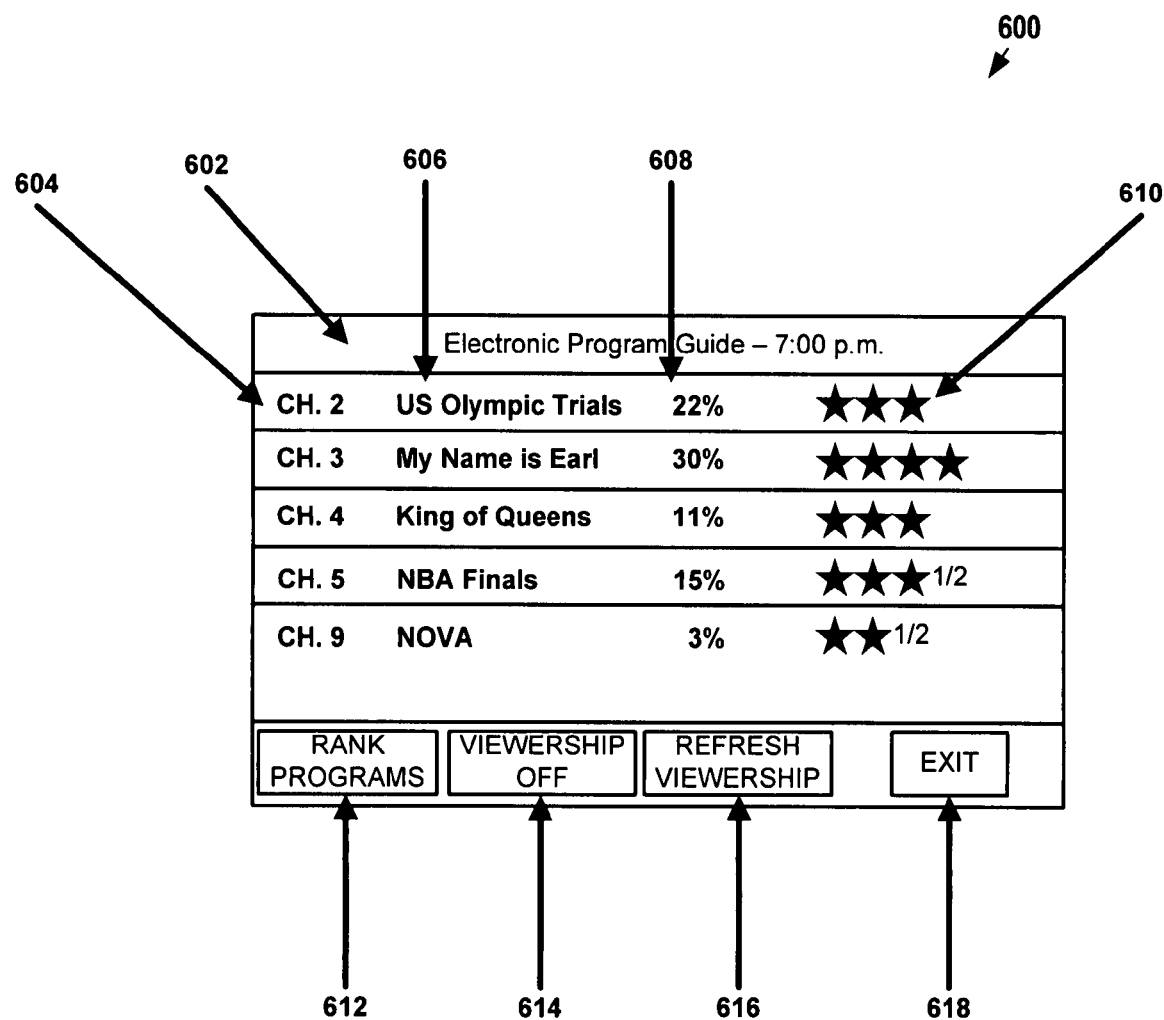
FIG. 6 is a diagram of an embodiment of a graphical user interface to provide viewership information.

FIG. 6 is a flow diagram of a particular illustrative embodiment of a graphical user interface (GUI) 600 that includes viewership information. The GUI 600 includes an electronic program guide (EPG) menu 602 that includes available channels 604 and associated program titles 606, which may be carried over each of the available channels 604. The EPG menu 602 can also include audience/viewership information 608 that related to viewership data retrieved from one or more edge routers of a content delivery network. The viewership information 608 can include data related to a percentage of set-top box devices to which the channel is being sent. In a particular illustrative embodiment, the percentage may be related to routing of media content data streams to customer premises equipment (CPE) at customer premises within a geographic area, a particular market area, other areas, or any combination thereof. The EPG menu 602 can also include a visual indicator 610 of the viewership information 608, such as a number of stars.

The EPG menu 602 can include selectable indicators, such as soft buttons, to adjust the data displayed within the EPG menu 602. The soft buttons can be selected, for example, by using arrow keys and a select key on a remote control device. For example, the EPG menu 602 can include a "Rank Programs" button 612 that may be selected to order the programs within the EPG menu 602 based on the viewership information 608, instead of organizing the programs by channel 604. Additionally, the EPG menu 602 may include a "Viewership Off" button 614 to disable display of the viewership information 608 and the associated visual indicator 610. The EPG menu 602 may also include a "Refresh Viewership" button 616 to update the viewership information 608 and the associated visual indicator 610 with current viewership information in real time or near real time. Additionally, the EPG menu 602 may include an "Exit" button 618, which may be accessed by a user via a remote control device to exit the EPG menu 602.

Figure 7:
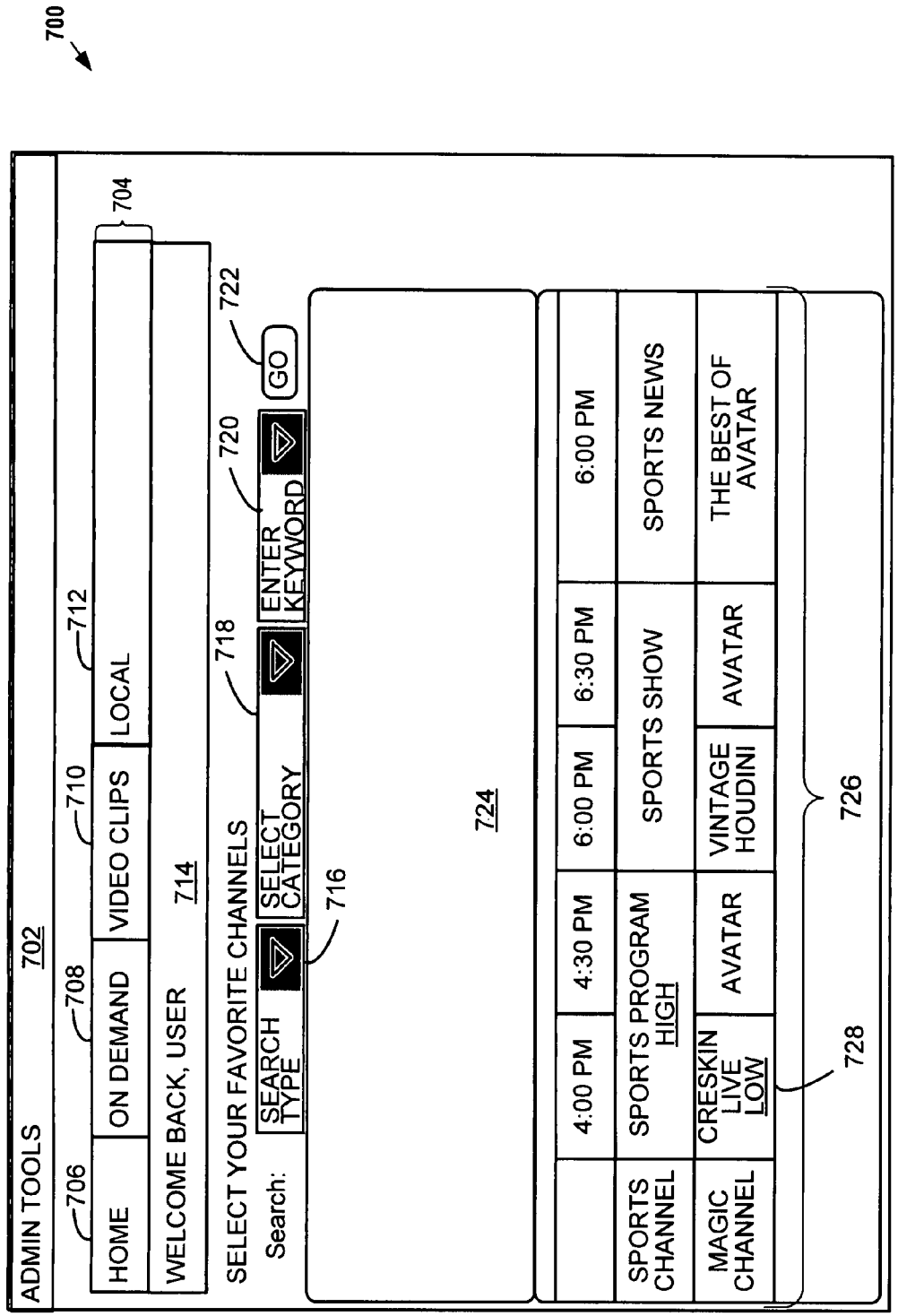
FIG. 7 is a diagram of a second embodiment of a graphical user interface to provide viewership information.

FIG. 7 is a block diagram of a second illustrative embodiment of a graphical user interface (GUI) 700 to provide viewership information. The GUI 700 may be a web-based graphical user interface that may be accessed using a web browser application, for example. In a particular illustrative embodiment, the GUI 700 includes a screen bar 702, "Admin Tools."

The GUI 700 also includes menu bar 704 that further includes selectable items, such as a "Home" button 706, an "On Demand" button 708, a "Video Clips" button 710, and a "Local Button" 712." The Home button 706 may be selected to return to a "home page" or other screen. The On Demand button 708 may be selected to access a listing of available "on demand" video content (e.g., video on demand items). The Video Clips button 710 may be selected to view trailers or other video clips. The Local button 712 may be selected to provide access to a listing of local channels, for example. The GUI 700 can also include a message box 714, which may display a current message such as "welcome back, user." The message box 714 can also display status information and other information based on user interactions with the GUI 700.

In a particular illustrative embodiment, the GUI 700 includes one or more search drop down boxes representing various criteria for searching electronic program guide information. For example, the GUI 700 may include a "Search Type" option 716 to select from one or more search types, such as "time/date," "channel," or other searches. The GUI 700 may also include a "Select Category" option 718 that can be selected to access one or more channel categories, such as movies, sports, other categories, or any combination thereof. The GUI 700 can also include an "Enter Keyword" option 720 that may be selected to access a text input to enter keywords. The GUI 700 can also include a "Go" button 722 to initiate the search. The GUI 700 may include search results in a text area 724. The text area 724 may also provide information about a selected channel from an electronic program guide (EPG) 726. The EPG 726 can include program title information. Additionally, viewership information, such as "Low Interest" may be reflected within the EPG 726 next to or adjacent to the title information, such as the viewership information 728. In this example, the viewership information 728 indicates a volume of viewers of a particular channel. For example, viewership of a particular program may be generally indicated using a descriptor, such as "Low," "Medium," or "High." Alternatively, the viewership information may be provided using a visual indicator such as a number of stars, using statistical data such as a percentage, using a visual indicator such as a shading or color of a particular program, using other indicators, or any combination thereof.

Figure 8:
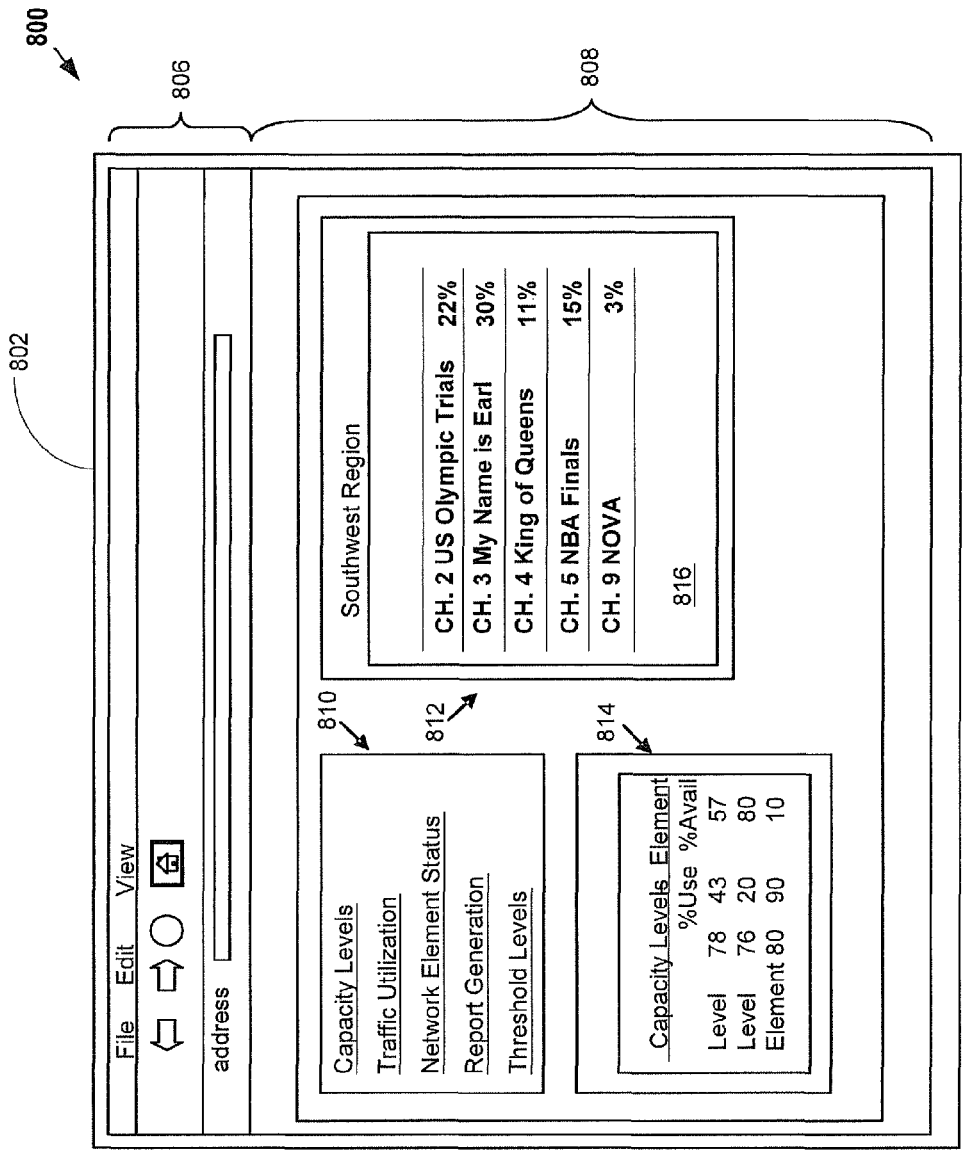
FIG. 8 is a diagram of a third embodiment of a graphical user interface to provide viewership information.

FIG. 8 is a diagram of a third embodiment of a graphical user interface (GUI) 800 to provide viewership information. The GUI 800 may be accessible via an Internet browser application to access viewership information by an authorized user of a content provider. The GUI 800 includes a window 802 including a menu bar portion 806 and a display portion 808. The menu bar portion 806 may include user selectable features of an Internet browser application, such as application menu selections (such as "File," "Edit," "View," other menu selections, or any combination thereof), selectable buttons (such as a back button, a forward button, a home button, other buttons, or any combination thereof), a uniform resource locator (URL) text input area, other selectable elements, or any combination thereof. The display portion 808 includes a first frame portion 810 that displays selectable links for accessing information about the routing of data within a content delivery network. The display portion 808 also includes a second frame portion 812 to display channel information including viewership information determined from multicast routing table data received from one or more edge routers. The display portion 808 also includes a third frame portion 814 that displays information related to the routing of media content data streams via one or more edge routers.

Figure 9:
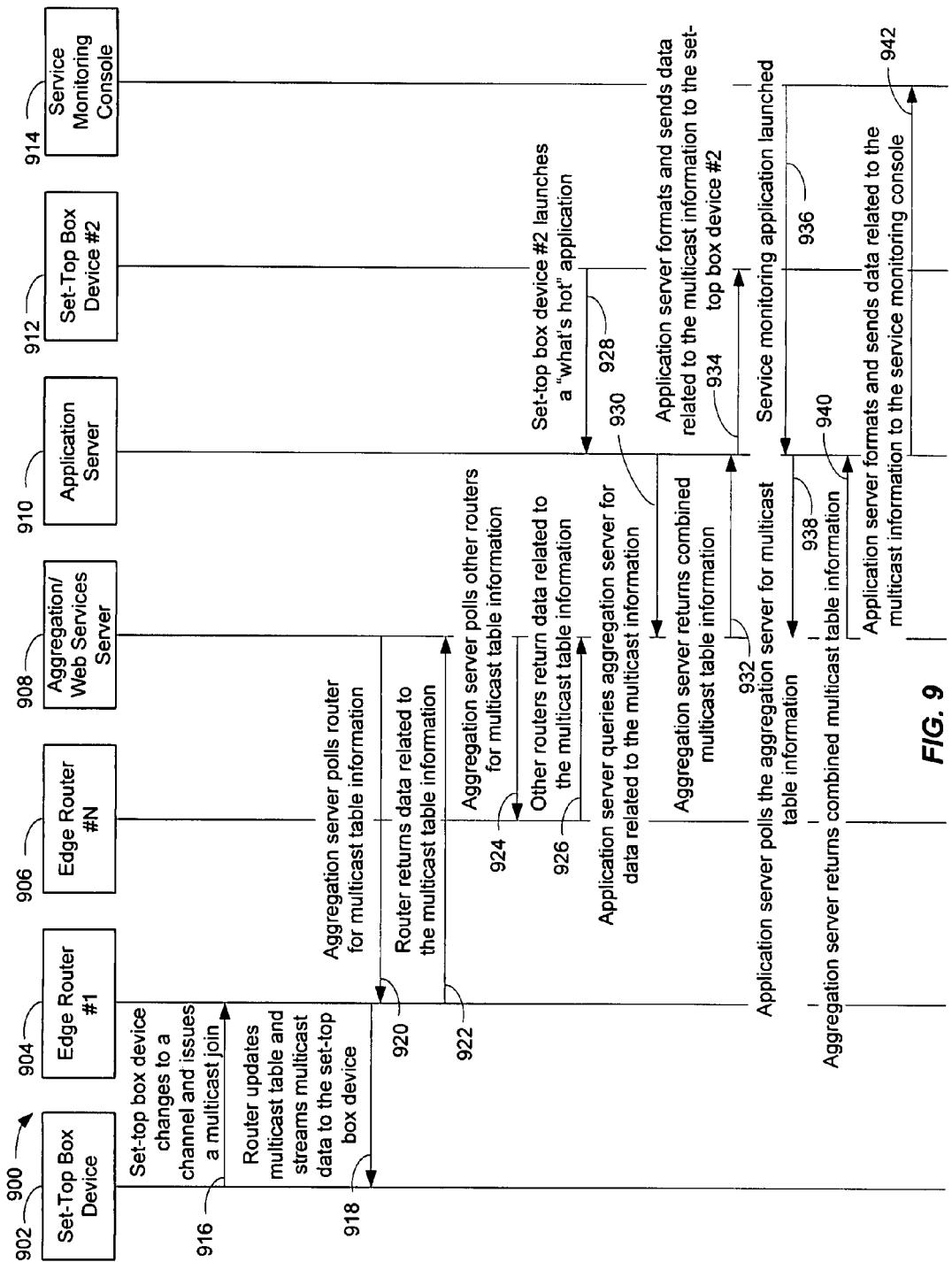
FIG. 9 is a ladder diagram illustrating an example of interactions between various modules to implement a particular embodiment of a method of determining viewership information.

FIG. 9 is a ladder diagram 900 illustrating an example of interactions between various modules to implement a particular embodiment of a method of determining viewership information. In particular, the ladder diagram 900 illustrates interactions between a set-top box device 902, an edge router (#1) 904, one or more edge routers (#N) 906, an aggregation/web services server 908, an application server 910, a set-top box device (#2) 912, and a service monitoring console 914.

The set-top box device 902 changes to a channel and issues a multicast join message 916 to the edge router (#1) 904. The multicast join message 916 may include channel information, set-top box identification information, other information, or any combination thereof. The edge router 904 updates a multicast routing table and streams multicast data 918 to the set-top box device 902.

The aggregation/web services server 908 polls the edge router (#1) 904 for multicast table information at 920. The edge router (#1) 904 sends data related to the multicast table information 922 to the aggregation/web services server 908. The aggregation/web services server 908 may poll other routers for multicast table information at 924, such as the one or more edge routers (#N) 906. The one or more edge routers (#N) 906 return data related to the multicast table information, at 926.

At 928, the set-top box device (#2) 912 launches a "What's Hot?" application, which sends a message to the application server 910 requesting viewership information. In a particular illustrative embodiment, the "What's Hot?" application may be launched by accessing a menu at the set-top box device (#2) 912, by selecting a button, or any combination thereof. At 930, the application server 910 queries the aggregation/web services server 908 for data related to the multicast information. Proceeding to 932, the aggregation/web services server 908 returns combined multicast table information to the application server 910. At 934, the application server 910 formats and sends data related to the multicast information to the set-top box device (#2) 912. The information may be formatted as part of a graphical user interface, an electronic program guide, another display, or any combination thereof.

At 936, a service monitoring console 914 may launch a service monitoring application by sending a message to the application server 910, such as via a public network. Proceeding to 938, the application server polls the aggregation/web services server 908 for the multicast table information. Advancing to 940, the aggregation/web services server 908 returns the combined multicast table information to the application server 910. The combined multicast table information may include multicast routing data from multicast routing tables associated with the edge router (#1) 904 and the one or more edge routers (#N) 906. Proceeding to 942, the application server 910 can format and send data related to the multicast routing table information to the service monitoring console 942. In a particular illustrative embodiment, the service monitoring console 942 may be a requesting device, such as a computer, a personal digital assistant, another device, or any combination thereof, that can access the application server 910 via a public network using a web browser application. In another particular illustrative embodiment, the service monitoring console 942 may be a software module, a server application, a monitoring system, or any combination thereof, that is adapted to communicate with the application server 910 to monitor viewership information. In a particular illustrative embodiment, an authorized user at a service provider may utilize the service monitoring console 914 to query the application server 910 to retrieve viewership information in real time or near real time. Such viewership information may be viewed within a graphical user interface that is rendered by the service monitoring console 914.

In conjunction with the configuration of structure described herein, the systems, methods, and associated graphical user interfaces (GUIs) disclosed include a system adapted to determine viewership information based on routing data stored at one or more routers of a media content distribution network. In general, while the interfaces described with respect to FIGS. 1-9 are indicated to be graphical user interfaces, it should be understood that the interfaces may be programmatic interfaces, command line interfaces, other non-graphical user interfaces, or any combination thereof. In a particular illustrative embodiment, media content may be received at a residential gateway at a customer premises and may be routed to multiple set-top boxes within the customer premises. In a particular illustrative, non-limiting embodiment, the viewership information may be determined based on data routed to the residential gateway, so that if multiple set-top box devices in a home are tuned to the same channel, the viewership information may reflect household information (i.e., a single media stream counted only once for the entire household, even if the household has four devices, for example, that are tuned to the same media content).

Figure 10:
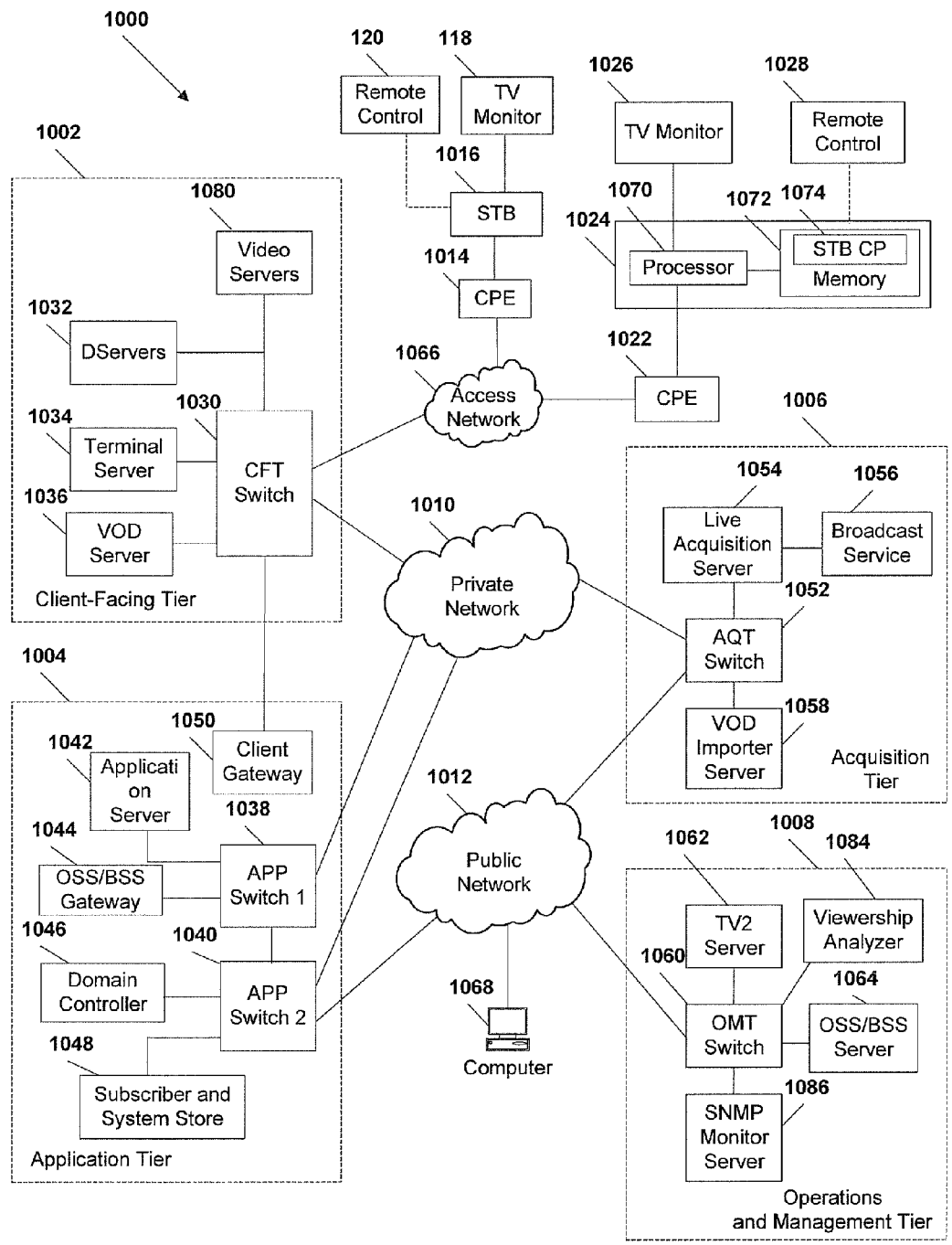
FIG. 10 is a block diagram of an illustrative embodiment of an Internet Protocol Television system including a system to determine viewership information.

Referring to FIG. 10, an illustrative embodiment of an Internet Protocol Television (IPTV) system is illustrated and is generally designated 1000. The IPTV system 1000 includes a viewership analyzer 1084 that may accumulate viewership information from one or more edge routers of the IPTV system 1000 and provide data related to the viewership information to set-top box devices, to requesting devices, to components of the IPTV system, or to any combination thereof. As shown, the system 1000 can include a client facing tier 1002, an application tier 1004, an acquisition tier 1006, and an operations and management tier 1008. Each tier 1002, 1004, 1006 and 1008 is coupled to a private network 1010; to a public network 1012, such as the Internet; or to both the private network 1010 and the public network 1012. For example, the client-facing tier 1002 can be coupled to the private network 1010. Further, the application tier 1004 can be coupled to the private network 1010 and to the public network 1012. The acquisition tier 1006 can also be coupled to the private network 1010 and to the public network 1012. Additionally, the operations and management tier 1008 can be coupled to the public network 1012.

As illustrated in FIG. 10, the various tiers 1002, 1004, 1006 and 1008 communicate with each other via the private network 1010 and the public network 1012. For instance, the client-facing tier 1002 can communicate with the application tier 1004 and the acquisition tier 1006 via the private network 1010. The application tier 1004 can communicate with the acquisition tier 1006 via the private network 1010. Further, the application tier 1004 can communicate with the acquisition tier 1006 and the operations and management tier 1008 via the public network 1012. Moreover, the acquisition tier 1006 can communicate with the operations and management tier 1008 via the public network 1012. In a particular embodiment, elements of the application tier 1004, including, but not limited to, a client gateway 1050, can communicate directly with the client-facing tier 1002.

The client-facing tier 1002 can communicate with user equipment via an access network 1066, such as an Internet Protocol Television (IPTV) access network. In an illustrative embodiment, customer premises equipment (CPE) 1014 and 1022 can be coupled to a local switch, router, or other device of the access network 1066. The client-facing tier 1002 can communicate with a first representative set-top box device 1016 via the first CPE 1014 and with a second representative set-top box device 1024 via the second CPE 1022. In a particular embodiment, the first representative set-top box device 1016 and the first CPE 1014 can be located at a first customer premise, and the second representative set-top box device 1024 and the second CPE 1022 can be located at a second customer premise. In another particular embodiment, the first representative set-top box device 1016 and the second representative set-top box device 1024 can be located at a single customer premise, both coupled to one of the CPE 1014 and 1022. The CPE 1014 and 1022 can include routers, local area network devices, modems, such as digital subscriber line (DSL) modems, any other suitable devices for facilitating communication between a set-top box device and the access network 1066, or any combination thereof.

In an exemplary embodiment, the client-facing tier 1002 can be coupled to the CPE 1014 and 1022 via fiber optic cables. In another exemplary embodiment, the CPE 1014 and 1022 can be digital subscriber line (DSL) modems that are coupled to one or more network nodes via twisted pairs, and the client-facing tier 1002 can be coupled to the network nodes via fiber-optic cables. Each set-top box device 1016 and 1024 can process data received via the access network 1066, via an IPTV software platform, such as Microsoft® TV IPTV Edition.

The first set-top box device 1016 can be coupled to a first external display device, such as a first television monitor 1018, and the second set-top box device 1024 can be coupled to a second external display device, such as a second television monitor 1026. Moreover, the first set-top box device 1016 can communicate with a first remote control 1020, and the second set-top box device 1024 can communicate with a second remote control 1028. The set-top box devices 1016 and 1024 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 1016 and 1024 can receive data, video, or any combination thereof, from the client-facing tier 1002 via the access network 1066 and render or display the data, video, or any combination thereof, at the display device 1018 and 1026 to which it is coupled. In an illustrative embodiment, the set-top box devices 1016 and 1024 can include tuners that receive and decode television programming signals or packet streams for transmission to the display devices 1018 and 1026. Further, the set-top box devices 1016 and 1024 can include a STB processor 1070 and a STB memory device 1072 that is accessible to the STB processor 1070. In one embodiment, a computer program, such as the STB computer program 1074, can be embedded within the STB memory device 1072.

In an illustrative embodiment, the client-facing tier 1002 can include an edge router 1030 that manages communication between the client-facing tier 1002 and the access network 1066 and between the client-facing tier 1002 and the private network 1010. As illustrated, the edge router 1030 is coupled to one or more data servers, such as D-servers 1032, that store, format, encode, replicate, or otherwise manipulate or prepare video content for communication from the client-facing tier 1002 to the set-top box devices 1016 and 1024. The edge router 1030 can also be coupled to a terminal server 1034 that can provide terminal devices with a point of connection to the IPTV system 1000 via the client-facing tier 1002. In a particular embodiment, the edge router 1030 can be coupled to a video-on-demand (VOD) server 1036 that can stores or provide VOD content imported by the IPTV system 1000. Further, the edge router 1030 is coupled to one or more video servers 1080 that receive video content and transmit the content to the set-top boxes 1016 and 1024 via the access network 1066. The edge router 1030 is also known as a client-facing tier (CFT) switch. The edge router 120 is an example of the edge router 1030.

In an illustrative embodiment, the client-facing tier 1002 can communicate with a large number of set-top boxes, such as the representative set-top boxes 1016 and 1024, over a wide geographic area, such as a metropolitan area, a viewing area, a statewide area, a regional area, a nationwide area or any other suitable geographic area, market area, or subscriber or customer group that can be supported by networking the client-facing tier 1002 to numerous set-top box devices. In a particular embodiment, the edge router 1030, or any portion thereof, can include a multicast router or switch that communicates with multiple set-top box devices via a multicast-enabled network. The viewership analyzer 1084 of the operations and management tier 1008 can request multicast routing table data from the edge router 1030 (and from other edge routers of the IPTV system 1000) and can process such data to determine viewership information of particular media content data streams. Such viewership information may be utilized by the operations and management tier 1008 to improve load balancing across the IPTV system 1000. Additionally, such viewership information may be provided to requesting devices, such as a computer 1068 or an STB, such as the STBs 1016 and 1024.

As illustrated in FIG. 10, the application tier 1004 can communicate with both the private network 1010 and the public network 1012. The application tier 1004 can include a first application tier (APP) switch 1038 and a second APP switch 1040. In a particular embodiment, the first APP switch 1038 can be coupled to the second APP switch 1040. The first APP switch 1038 can be coupled to an application server 1042 and to an OSS/BSS gateway 1044. In a particular embodiment, the application server 1042 can provide applications to the set-top box devices 1016 and 1024 via the access network 1066, which enable the set-top box devices 1016 and 1024 to provide functions, such as interactive program guides, video gaming, display, messaging, processing of VOD material and other IPTV content, etc. In an illustrative embodiment, the application server 1042 can provide location information to the set-top box devices 1016 and 1024. In a particular embodiment, the OSS/BSS gateway 1044 includes operation systems and support (OSS) data, as well as billing systems and support (BSS) data. In one embodiment, the OSS/BSS gateway 1044 can provide or restrict access to an OSS/BSS server 1064 that stores operations and billing systems data.

The second APP switch 1040 can be coupled to a domain controller 1046 that provides Internet access, for example, to users at their computers 1068 via the public network 1012. For example, the domain controller 1046 can provide remote Internet access to IPTV account information, e-mail, personalized Internet services, or other online services via the public network 1012. In addition, the second APP switch 1040 can be coupled to a subscriber and system store 1048 that includes account information, such as account information that is associated with users who access the IPTV system 1000 via the private network 1010 or the public network 1012. In an illustrative embodiment, the subscriber and system store 1048 can store subscriber or customer data and create subscriber or customer profiles that are associated with IP addresses, stock-keeping unit (SKU) numbers, other identifiers, or any combination thereof, of corresponding set-top box devices 1016 and 1024. In another illustrative embodiment, the subscriber and system store can store data associated with capabilities of set-top box devices associated with particular customers.

In a particular embodiment, the application tier 1004 can include a client gateway 1050 that communicates data directly to the client-facing tier 1002. In this embodiment, the client gateway 1050 can be coupled directly to the edge router 1030. The client gateway 1050 can provide user access to the private network 1010 and the tiers coupled thereto. In an illustrative embodiment, the set-top box devices 1016 and 1024 can access the IPTV system 1000 via the access network 1066, using information received from the client gateway 1050. User devices can access the client gateway 1050 via the access network 1066, and the client gateway 1050 can allow such devices to access the private network 1010 once the devices are authenticated or verified. Similarly, the client gateway 1050 can prevent unauthorized devices, such as hacker computers or stolen set-top box devices from accessing the private network 1010, by denying access to these devices beyond the access network 1066.

For example, when the first representative set-top box device 1016 accesses the client-facing tier 1002 via the access network 1066, the client gateway 1050 can verify subscriber information by communicating with the subscriber and system store 1048 via the private network 1010. Further, the client gateway 1050 can verify billing information and status by communicating with the OSS/BSS gateway 1044 via the private network 1010. In one embodiment, the OSS/BSS gateway 1044 can transmit a query via the public network 1012 to the OSS/BSS server 1064. After the client gateway 1050 confirms subscriber and/or billing information, the client gateway 1050 can allow the set-top box device 1016 to access EPTV content and VOD content at the client-facing tier 1002. If the client gateway 1050 cannot verify subscriber information for the set-top box device 1016, e.g., because it is connected to an unauthorized twisted pair, the client gateway 1050 can block transmissions to and from the set-top box device 1016 beyond the access network 1066.

As indicated in FIG. 10, the acquisition tier 1006 includes an acquisition tier (AQT) switch 1052 that communicates with the private network 1010. The AQT switch 1052 can also communicate with the operations and management tier 1008 via the public network 1012. In a particular embodiment, the AQT switch 1052 can be coupled to a live acquisition server 1054 that receives or acquires television content, movie content, advertisement content, other video content, or any combination thereof, from a broadcast service 1056, such as a satellite acquisition system or satellite head-end office. In a particular embodiment, the live acquisition server 1054 can transmit content to the AQT switch 1052, and the AQT switch 1052 can transmit the content to the edge router 1030 via the private network 1010.

In an illustrative embodiment, content can be transmitted to the D-servers 1032, where it can be encoded, formatted, stored, replicated, or otherwise manipulated and prepared for communication from the video server(s) 1080 to the set-top box devices 1016 and 1024. The edge router 1030 can receive content from the video server(s) 1080 and communicate the content to the CPE 1014 and 1022 via the access network 1066. The set-top box devices 1016 and 1024 can receive the content via the CPE 1014, 1022, and can transmit the content to the television monitors 1018 and 1026. In an illustrative embodiment, video or audio portions of the content can be streamed to the set-top box devices 1016 and 1024.

Further, the AQT switch 1052 can be coupled to a video-on-demand importer server 1058 that receives and stores television or movie content received at the acquisition tier 1006 and communicates the stored content to the VOD server 1036 at the client-facing tier 1002 via the private network 1010. Additionally, at the acquisition tier 1006, the video-on-demand (VOD) importer server 1058 can receive content from one or more VOD sources outside the IPTV system 1000, such as movie studios and programmers of non-live content. The VOD importer server 1058 can transmit the VOD content to the AQT switch 1052 and the AQT switch 1052 and the VOD import server 1058 can communicate the material to the edge router 1030 via the private network 1010. The VOD content can be stored at one or more servers, such as the VOD server 1036.

When users issue requests for VOD content via the set-top box devices 1016, 1024, the requests can be transmitted over the access network 1066 to the VOD server 1036, via the edge router 1030. Upon receiving such requests, the VOD server 1036 can retrieve the requested VOD content and transmit the content to the set-top box devices 1016 and 1024 across the access network 1066, via the edge router 1030. The set-top box devices 1016 and 1024 can transmit the VOD content to the television monitors 1018 and 1026. In an illustrative embodiment, video or audio portions of VOD content can be streamed to the set-top box devices 1016 and 1024.

FIG. 10 further illustrates that the operations and management tier 1008 can include an operations and management tier (OMT) switch 1060 that conducts communication between the operations and management tier 1008 and the public network 1012. In the embodiment illustrated by FIG. 10, the OMT switch 1060 is coupled to a TV2 server 1062. Additionally, the OMT switch 1060 can be coupled to an OSS/BSS server 1064 and to a simple network management protocol (SNMP) monitor 1086 that monitors network devices within or coupled to the IPTV system 1000. The viewership analyzer 1084 is coupled to the OMT switch 1060 to access the public network 1012. The viewership analyzer 1084 may transmit requests for multicast routing table data to the edge router 1030 via the public network 1012 and may receive data related to multicast routing table data from the edge router 1030. The viewership analyzer 1084 may analyze the data related to the multicast routing table data to determine viewership information and may provide such information to the STBs 1016 and 1024, to a service provider 1015 and 1013, to a computer 1068, or to any combination thereof. In a particular embodiment, the OMT switch 1060 can communicate with the AQT switch 1052 via the public network 1012.

In an illustrative embodiment, the live acquisition server 1054 can transmit content to the AQT switch 1052, and the AQT switch 1052 and the live acquisition server 1054 can transmit the content to the OMT switch 1060 via the public network 1012. In this embodiment, the OMT switch 1060 can transmit the content to the TV2 server 1062 for display to users accessing the user interface at the TV2 server 1062. For example, a user can access the TV2 server 1062 using a personal computer 1068 coupled to the public network 1012.

Figure 11:
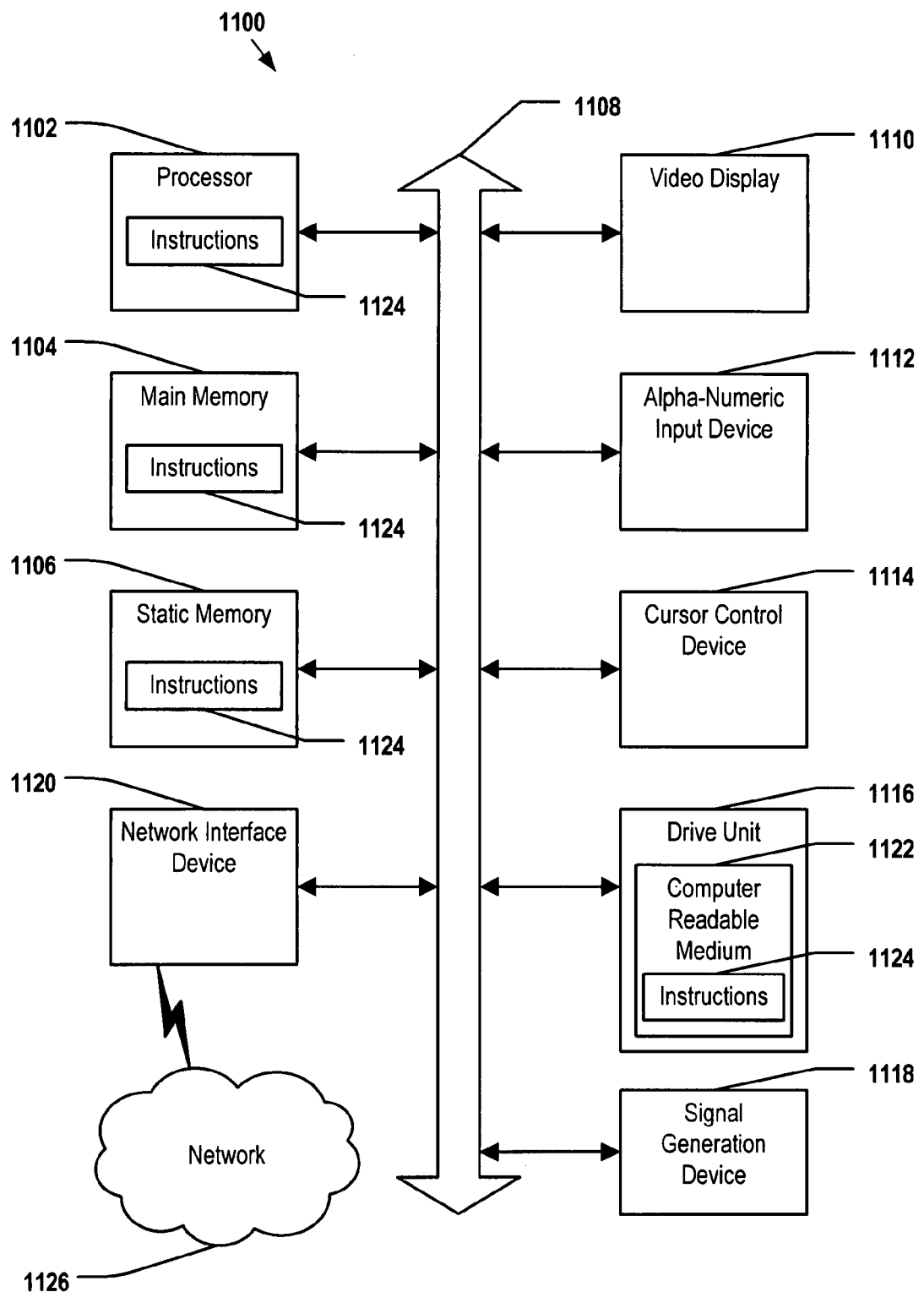
FIG. 11 is a block diagram of a particular embodiment of a general computing system.

Referring to FIG. 11, an illustrative embodiment of a general computer system is shown and is designated 1100. The computer system 1100 can be a CPE 122, 124 or 126 and/or device 130. The computer system 1100 can include a set of instructions that can be executed to cause the computer system 1100 to perform any one or more of the methods or computer based functions described above with respect to FIGS. 1-4 and 6-9. The computer system 1100, or any portion thereof, may operate as a standalone device or may be connected, e.g., using a network, to other computer systems or peripheral devices, including the acquisition server 112, the CPE 122, 126, and 130 illustrated in FIG. 1, the set-top box devices 1016 and 1018 illustrated in FIG. 10, or any of the servers, the computer 1068, the video device 1078, the cell phone 1076, or the CPE devices 1014, and 1022 illustrated in FIG. 10.

In a networked deployment, the computer system may operate in the capacity of an IPTV server, such as a video server or application server, or a set-top box device. The computer system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

As illustrated in FIG. 11, the computer system 1100 may include a processor 1102, e.g., a central processing unit (CPU), a graphics-processing unit (GPU), or both. Moreover, the computer system 1100 can include a main memory 1104 and a static memory 1106 that can communicate with each other via a bus 1108. As shown, the computer system 1100 may further include a video display unit 1110, such as a liquid crystal display (LCD), an organic light emitting diode (OLED), a flat panel display, a solid state display, or a cathode ray tube (CRT). Additionally, the computer system 1100 may include an input device 1112, such as a keyboard, and a cursor control device 1114, such as a mouse. The computer system 1100 can also include a disk drive unit 1116, a signal generation device 1118, such as a speaker or remote control, and a network interface device 1120.

In a particular embodiment, as depicted in FIG. 11, the disk drive unit 1116 may include a computer-readable medium 1122 in which one or more sets of instructions 1124, e.g. software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and via the modules, or as portions of an application-specific integrated circuit. Accordingly, the present system encompasses software, firmware, and hardware implementations.

In accordance with various embodiments of the present disclosure, the methods described herein may be implemented by software programs executable by a computer system to determine viewership information based on data retrieved from multicast routing tables associated with one or more edge routers of a content delivery network, such as an Internet Protocol Television (IPTV) network. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal, so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of determining viewership information, the method comprising:
   retrieving multicast routing table data via a first network by retrieving a corresponding portion of the multicast routing table data stored at each of a plurality of edge routers, wherein each retrieved portion includes a corresponding plurality of entries associated with media content distributed by a corresponding edge router of the plurality of edge routers;
   determining viewership information based on the multicast routing table data retrieved from the plurality of edge routers; and
   sending the viewership information to a requesting device via a second network.

2. The method of claim 1, further comprising:
   sending a request for the multicast routing table data to each of the plurality of edge routers; and
   receiving the corresponding portion of the multicast routing table data from each of the plurality of edge routers in response to the request.

3. The method of claim 1, wherein determining the viewership information comprises analyzing the multicast routing table data to determine mappings between one or more multicast media content streams and one or more respective set-top box devices.

4. The method of claim 3, wherein analyzing the multicast routing table data further comprises:
determining the viewership information associated with a plurality of channels, each channel of the plurality of channels related to a particular multicast media content stream transmitted to a particular set-top box device of the one or more set-top box devices; and
aggregating the viewership information for each channel of the plurality of channels.

5. The method of claim 1, further comprising receiving a request for the viewership information from the requesting device via the second network.

6. The method of claim 1, wherein sending the viewership information comprises:
generating a graphical user interface based on the viewership information; and
sending the graphical user interface to the requesting device.

7. The method of claim 1, wherein the requesting device comprises a set-top box device and wherein sending the viewership information comprises sending a graphical user interface including statistics related to the viewership information.

8. The method of claim 1, wherein the requesting device comprises a set-top box device.

9. The method of claim 1, wherein the first network comprises a private network and wherein the second network comprises a public network.

10. A system to determine viewership information, the system comprising:
an interface to communicate with a plurality of edge routers via a private network; and
a data analyzer coupled to the interface, the data analyzer adapted to:
retrieve multicast routing table data via the interface by retrieving a corresponding portion of the multicast routing table data stored at each of the plurality of edge routers, wherein each retrieved portion includes a corresponding plurality of entries associated with media content distributed by a corresponding edge router of the plurality of edge routers; and
determine viewership information based on the multicast routing table data.

11. The system of claim 10, further comprising a second interface responsive to a second network, wherein the data analyzer is adapted to send the viewership information to a requesting device via the second interface.

12. The system of claim 10, wherein the multicast routing table data comprises a device identifier, date information, time information, and media content information.

13. The system of claim 10, wherein the private network comprises an internet protocol television access network.

14. The system of claim 10, wherein the viewership information is determined by:
calculating device viewership data associated with each of a plurality of customer premises equipment devices; and
aggregating the device viewership data to produce viewership data and including the viewership data in the viewership information.

15. The system of claim 14, wherein the viewership information is further determined by determining statistical information related to the viewership data and including the statistical information in the viewership information.

16. A system to determine viewership information, the system comprising:

processing logic and memory accessible to the processing logic, the memory comprising instructions executable by the processing logic to perform a method comprising:
retrieving multicast routing table data via a first network by retrieving a corresponding portion of the multicast routing table data stored at each of a plurality of edge routers, wherein each retrieved portion includes a corresponding plurality of entries associated with media content distributed by a corresponding edge router of the plurality of edge routers;
determining viewership information based on the multicast routing table data retrieved from the plurality of edge routers; and
sending the viewership information to a requesting device via a second network.

17. The system of claim 16, wherein determining viewership information comprises
analyzing the multicast routing table data to determine viewership data associated with a particular program.

18. The system of claim 16, wherein determining the viewership information comprises analyzing the multicast routing table data to determine mappings between one or more multicast media content streams and one or more respective set-top box devices.

19. The system of claim 18, wherein the method further comprises:
determining the viewership information associated with a plurality of channels, wherein each channel of the plurality of channels is related to a particular multicast media content stream transmitted to the one or more set-top box devices; and
aggregating the viewership information for each channel of the plurality of channels.

20. The system of claim 16, wherein the method further comprises:
generating a graphical user interface including the viewership information; and
sending the graphical user interface to the requesting device.

21. The system of claim 16, wherein the requesting device comprises a set-top box device associated with a subscriber to a media content delivery service.

22. A method comprising:
receiving multicast routing table data via a network by receiving a corresponding portion of the multicast routing table data stored at each of a plurality of edge routers, wherein each retrieved portion includes a corresponding plurality of entries associated with media content distributed by a corresponding edge router of the plurality of edge routers; and
analyzing the received multicast routing table data to determine viewership information.

23. The method of claim 22, wherein analyzing the multicast routing table data comprises mapping the multicast routing table data to specific media content data streams from a media content delivery service.

24. The method of claim 22, further comprising sending the viewership information to a requesting device in response to a request from the requesting device.

25. The method of claim 24, wherein the requesting device comprises one of a network monitoring system, a customer premises equipment device, and a computing device.

26. The method of claim 24, wherein sending the viewership information comprises:

generating a graphical user interface including data related to the viewership information, wherein the data comprises statistics determined from the viewership information; and sending the graphical user interface to the requesting device via a public network.

* * * * *